(12) United States Patent
Deiss et al.

(10) Patent No.: US 11,192,167 B2
(45) Date of Patent: Dec. 7, 2021

(54) MACHINE WORKPIECE HANDLING (71) Applicants: TRUMPF Werkzeugmaschinen GmbH + Co. KG, Ditzingen (DE); J. Schmalz GmbH, Glatten (DE)

(72) Inventors: Magnus Deiss, Stuttgart (DE); Peter Epperlein, Leonberg (DE); Frank Schmauder, Metzingen (DE); Fabian Gaeckle, Althengstett (DE); Jens Ottnad, Karlsruhe (DE); Heinz-Juergen Prokop, Essen (DE); Stefan Stroebel, Stuttgart (DE); Walter Dunkmann, Baden-Baden (DE); Thomas Eisele, Alpirsbach-Peterzell (DE); Rainer Hoehn, Dornstetten (DE); Dirk Plaueln, Dornstetten-Hallwangen (DE); Hermann Reinisch, Sulz a. N./Hopfau (DE)

(73) Assignees: TRUMPF Werkzeugmaschinen GmbH + Co. KG, Ditzingen (DE); J. Schmalz GmbH, Glatten (DE)

( * ) Notice: Subject to any disclaimer, the term of this patent is extended or adjusted under 35 U.S.C. 154(b) by 430 days.

(21) Appl. No.: 16/201,196

(22) Filed: Nov. 27, 2018

(65) Prior Publication Data
US 2019/0091754 A1 Mar. 28, 2019

Related U.S. Application Data

(63) Continuation of application No. PCT/EP2017/062928, filed on May 29, 2017.

(30) Foreign Application Priority Data

Jun. 8, 2016 (DE) .......................... 102016110542.2

(51) Int. Cl.
*B23K 26/38* (2014.01)
*B21D 43/02* (2006.01)
(Continued)

(52) U.S. Cl.
CPC .......... *B21D 43/027* (2013.01); *B21D 28/00* (2013.01); *B21D 43/18* (2013.01);
(Continued)

(58) Field of Classification Search
CPC .... B23K 26/38; B23K 37/0408; B23K 26/10; B23K 2101/18; B21D 28/06; B21D 43/18;
(Continued)

(56) References Cited

U.S. PATENT DOCUMENTS 6,835,040 B2 * 12/2004 Quiring .............. B23K 26/0838
414/281
2003/0147729 A1 8/2003 Leibinger et al.
(Continued)

FOREIGN PATENT DOCUMENTS

DE 10 2010 031 001 7/2011
DE 10 2013 226 818 7/2015
(Continued)

OTHER PUBLICATIONS

International Search Report and Written Opinion in International Application No. PCT/EP2017/062928, dated Aug. 30, 2017, 17 pages (with English translation).
(Continued)

*Primary Examiner* — Mahdi H Nejad
(74) *Attorney, Agent, or Firm* — Fish & Richardson P.C.

(57) ABSTRACT

A loading and unloading device for a machine, a machine for machining panel-like workpieces, and a workpiece support for such a machine and a method for loading and unloading such a machine, having a loading and unloading module,
(Continued)

wherein the loading and unloading module has a vertically upwardly oriented raising device for lifting a cut-free workpiece part and a vertically downwardly oriented gripping device (38) for holding an unmachined, panel-like workpiece.

18 Claims, 7 Drawing Sheets

(51) Int. Cl.
*B21D 28/00* (2006.01)
*B21D 43/18* (2006.01)
*B23K 37/04* (2006.01)
*B23Q 7/04* (2006.01)

(52) U.S. Cl.
CPC ............ *B23K 37/0408* (2013.01); *B23Q 7/04* (2013.01); *B23Q 2240/002* (2013.01)

(58) Field of Classification Search
CPC ...... B21D 43/02; B21D 28/00; B65G 47/918; B23Q 7/04; B23Q 2240/002
USPC .......................................... 414/752.1; 294/65
See application file for complete search history.

(56) References Cited

U.S. PATENT DOCUMENTS

| | | | |
|---|---|---|---|
| 2013/0298739 A1* | 11/2013 | Bauch | B21D 43/282 83/27 |
| 2017/0120479 A1* | 5/2017 | Acworth | B28D 1/22 |
| 2018/0370058 A1* | 12/2018 | Fukada | B23K 37/00 |
| 2019/0039197 A1* | 2/2019 | Schmauder | B23Q 1/015 |
| 2020/0109016 A1* | 4/2020 | Zaffaroni | B21D 43/003 |
| 2020/0354100 A1* | 11/2020 | Hirono | B65G 47/914 |

FOREIGN PATENT DOCUMENTS

| | | |
|---|---|---|
| DE | 10 2014 209 811 | 11/2015 |
| DE | 10 2015 207 122 | 6/2016 |
| JP | H04 187333 | 7/1992 |
| WO | WO 96/14965 | 5/1996 |
| WO | WO 2015/091347 | 6/2015 |

OTHER PUBLICATIONS

International Preliminary Report on Patentability in International Application No. PCT/EP2017/062928, dated Dec. 20, 2018, 7 pages (English translation).

* cited by examiner

MACHINE WORKPIECE HANDLING

CROSS REFERENCE TO RELATED APPLICATIONS

This application is a continuation of and claims priority under 35 U.S.C. § 120 from PCT Application No. PCT/EP2017/062928 filed on May 29, 2018, which claims priority from German Application No. 10 2016 110 542.2 filed on Jun. 8, 2016. The entire contents of each of these priority applications are incorporated herein by reference.

TECHNICAL FIELD

The invention relates to a machine for the separating processing of plate-shaped workpieces, and to a loader/unloader and a workpiece support for such a machine, and related methods.

BACKGROUND

A plate-shaped workpiece processing machine with a workpiece support is known from DE 10 2015 207 122.

A separate handling device can be provided for removing the processed workpiece parts from a first support part. Alternatively, a manual removal of the processed components is possible. Smaller workpiece parts can be discharged through a gap between the first support part and the further support part. Such a discharging of processed workpiece parts is known from DE 10 2013 226 818 B4.

Furthermore, a machine having a workpiece support is known from US 2003/0147729 A1, in which a handling device is arranged next to the workpiece support. An unprocessed workpiece is supplied to the workpiece support by this handling device. The workpiece to be processed is moved transversely to the movement direction of the workpiece support by means of a workpiece movement device.

Furthermore, a machine for processing plate-shaped workpieces is known from DE 10 2014 209 811 A1, in which a lifting device provided below the workpiece is positioned in relation to the workpiece part to be removed after separating the workpiece parts from the plate-shaped workpiece.

SUMMARY

The invention features a loading and unloading device and a machine for processing plate-shaped workpieces, by means of which compact structural shapes and a multiple use of movement axes and movement devices is possible.

One aspect of the invention features a loading and unloading device for a machine for the separating processing of plate-shaped workpieces. The device has at least one loading and unloading module having a lifting device aligned vertically upwards for raising a freely separated workpiece part in relation to a workpiece support, and a gripping device aligned vertically downwards for fixing an unprocessed plate-shaped workpiece. Support struts of the loading and unloading device, which support the loading and loading module, can be moveably received up and down on a machine base frame or on an individual device. Thus, the loading and unloading module can be lowered onto a loading level, such that gripping an unprocessed workpiece is made possible in order to then be raised to a higher level in order to deposit the plate-shaped material on a support part of a workpiece support. Furthermore, the loading and unloading module can be raised to a lifting level along the same axis and by means of the same movement device, in order to lift up the processed workpiece resting on a support part of the workpiece support in relation to the workpiece support surface of the workpiece support. The support struts can be part of a closed support frame, which shiftably bears at least one support beam, on which the loading and unloading module is shiftably mounted. Alternatively, the support struts can be mounted without mutual connection to be guided in a base frame, or have at least one crossbar for the mutual connection.

With the loading and unloading device, it is preferably provided that the lifting device be positioned above and the gripping device below the support beam, which can be shifted on the support struts or on the support frame. As a result, a compact structural shape can be created, in order to be able to also integrate this loading and unloading device into a base frame of a machine having a workpiece support.

The lifting device and the gripping device are preferably fixedly attached to each other by a common guiding section and, preferably, mounted by the guiding section on the support beam and can be shifted together along the support beam. This contributes to the compact structural shape of the loading and unloading device. Moreover, the control for a positioning and a shifting movement corresponding to the handling task of the lifting device and/or the gripping device is simplified.

It is preferably provided that the lifting device and the gripping device of the loading and unloading module be arranged offset in the longitudinal direction of the support beam, such that the lifting device is positioned above a support strut in an end position of the loading and unloading module relative to the support beam. This has the advantage, for example, that the lifting device can be positioned in this end position next to a processing position, e.g., a cutting gap between a first and a second support part of the workpiece support, and workpiece parts can also be raised and unloaded, which are positioned next to the cutting gap.

Several loading and unloading modules can be provided on the at least one support beam of the loading and unloading device, said loading and unloading modules being able to be transferred into a position in relation to one another in which the lifting devices are arranged adjacent to one another and form a lifting unit with a large surface area. This enables high flexibility during an unloading process. For example, the individual loading and unloading modules provided on the support beam can each be allocated to different workpiece parts, or form a lifting unit with a large surface area depending on the number of lifting devices lined up one next to the other.

Advantageously, the loading and unloading modules arranged on the support beam are shiftably powered by a common drive. As a result, a cost effective and compact design can, in turn, be created. A controllable coupling can be provided on each loading and unloading module to individually control the loading and unloading modules for a shifting movement along the support beam, said coupling being able to be coupled to the drive.

Firstly, a rough positioning can take place along a first shifting path to position the loading and unloading module in a lifting position, said rough positioning being controlled by means of a path measuring device of the drive for the loading and unloading module. Then, a fine positioning of the loading and unloading module can take place by means of a comparison of the measured values of the path measuring device of the drive with the absolute measured values. After this, an exact positioning of the loading and unloading module is set for the lifting device along the support beam, in order to enable a secure lifting of the workpiece part in relation to the workpiece support surface.

With the loading and unloading device, it is furthermore preferably provided that at least one support beam shiftably driven along the support strut or the support frame and a shiftable and non-driven support beam are arranged on the support strut or on the support frame. This non-driven support beam is shifted by the adjacent driven support beam, according to a so-called master-slave principle. As a result, there is no need for a drive. In order to be able to also shift the non-driven support beam in a pulling manner, a coupling device for coupling the two support beams has to be provided. In particular, two support beams shiftably driven along the support strut or the support frame and a shiftable and non-driven support beam between the other two can be arranged on the loading and unloading device, such that the non-driven support beam can be moved in a pushing manner respectively in a positive and negative direction by means of one of the two driven support beams, and a coupling device is not necessary.

Furthermore, it is preferably provided that the non-driven support beam only has at least one gripping device and no lifting device. The gripping device supports the loading process with large plate-shaped workpieces so that these do not sag. Since the freely separated or processed workpiece parts are smaller than the unprocessed workpieces, the number of lifting devices of the loading and unloading device is advantageously chosen to be smaller than the number of gripping devices.

It is preferably provided that several gripping devices of the non-driven support beam are arranged on a carriage which can be shifted along the support beam. These gripping devices can thus be moved as well by the unprocessed workpiece, when this is moved horizontally, for example when shifting into the clamping claw of the workpiece movement unit. In order to return these gripping devices or the carriage into the starting position, a return element, in particular a pneumatic cylinder or a spring, can be provided, preferably in the support beam.

Furthermore, it is preferably provided that the lifting device of the loading and unloading module extends transversely to the support beam in such a way that the two lifting devices of the driven support beam abut on (are adjacent to) each other on the end face side with the sequence of two driven support beams and a support beam lying in between without a lifting device. In this way, a closed lifting surface emerges when several lifting devices are used in order to remove large workpiece parts.

The lifting device of the loading and unloading module advantageously consists of several individually controllable pin modules, which have one or more lifting pins, which are controlled, preferably also individually controlled, in an extendable and retractable manner. This makes it possible to exchange individual pin modules and to complement the lifting device in a simple manner by further pin modules, when the extent of the lifting device is to be changed.

Advantageously, the extending direction of the lifting pins is controlled pneumatically. A pressure force of the individual lifting pins can be adjusted depending on the number of the lifting pins to be extended. Each lifting pin can apply, for example, a force of 100 Newton. If several lifting pins are used to lift a workpiece part, then the force of the individual lifting pins can be limited, such that the overall force lies below a fixed threshold value.

The gripping device of the loading and unloading module preferably comprises at least one suction element, in particular a vacuum suction cup, which can advantageously be moved back and forth in the vertical direction. As a result of the vertical shifting movement of the gripping device, it is made possible that there is a detaching strategy when gripping and raising an unprocessed workpiece from a stack of unprocessed workpieces, even if there is an increased adhesion force between the workpiece to be raised and the workpiece remaining on the stack. A so-called scaling process can be initiated and carried out by a time-offset vertical movement of several gripping devices along a support beam.

Both the movement of the lifting pins and the vertical movement of the gripping device of the loading and unloading module can be controllable by means of a common compressed air supply. As a result, in turn, the construction is made simpler and a more compact constructive form is obtained.

Adjacent the gripping device, a hold-down device can be arranged vertically pointing downwards on the loading and unloading module. As a result, the workpiece to be raised can be held down during a vertical raising movement of the gripping device in order to thus support the scaling of the workpiece from the workpiece stack.

Another aspect of the invention features a machine for the separating processing of plate-shaped workpieces having a workpiece surface for bearing a workpiece to be processed and for bearing a processed workpiece part, in which the above-described loading and unloading device is selectively movable vertically below the workpiece surface or laterally adjacent to the workpiece surface, and in which the workpiece surface or a surface part of the workpiece support can be moved or shifted horizontally above and below the loading and unloading device.

In some embodiments, it is provided that the workpiece support has a first support part and a further support part, wherein the further support part can be moved horizontally, and the loading and unloading device is arranged below the first support part. As a result, the loading and unloading device can be integrated and positioned inside a machine base frame of the machine in a space-saving manner.

In this case, the support struts or the support frame of the loading and unloading device are preferably formed to also receive and to support the first support part of the workpiece support. In this manner, the first support part can be shifted together with the loading and unloading device in terms of height, such that the further support part can be positioned by means of a horizontal shifting movement under the first support part and under the loading and unloading device in order to be loaded with an unprocessed workpiece. In addition, the support struts or the support frame of the loading and unloading device may be moveable upwards so far that the further support part can be arranged under the gripping devices with the workpiece set thereon.

According to an alternative, particularly with existing machines, an arrangement of the loading and unloading device in a separate frame next to the machine base frame or the workpiece support of the machine is made possible, in order to automate the loading and unloading and thus to obtain a cycle time reduction and a process time optimization resulting from this. The requirement for this is that the workpiece support or at least one support part of the workpiece support of the machine can be shifted horizontally in order to be able to be positioned above and below the loading and unloading device.

When the workpiece support or a support part of the machine is formed by several profile bodies, which are spaced apart in parallel to one another by respectively forming a gap, and when the lifting device has several lifting pins for extending and retracting, which have a spacing in relation to one another in the direction perpendicular to the profile bodies, said spacing corresponding to the spacing of the gaps, the one flexible positioning of the loading and unloading modules is thus made possible. In a direction parallel to the gaps between the profile bodies, the loading and unloading modules can be positioned in any step-less manner.

Another aspect of the invention features a workpiece support for a machine for the separating processing of plate-shaped workpieces, which has a workpiece support surface, which is formed by several profile bodies spaced apart in parallel to one another and each respectively form a gap between two adjacent profile bodies. Each of the profile bodies receives either support balls or rollers for bearing a workpiece or at least one brush element, which extends along the profile body and on which a workpiece supported by the workpiece support abuts. Such a workpiece support enables a step-less positioning of lifting pins of a lifting device in a direction on an X-Y plane, along which the profile bodies of the workpiece support surface extend. Thus, in a direction of the X-Y plane, independently of a grid or hole pattern of the workpiece support, a lifting position can be controlled by the lifting device and can be assumed without steps. Preferably, the gaps formed between the profile bodies extend in parallel to a (main) shifting axis of a processing tool of the machine. A preferably generated shifting movement of the plate-shaped workpiece on the workpiece support or the support part advantageously takes place in the direction perpendicular to the gaps in the XY plane. This arrangement enables a maximum flexibility when positioning the lifting device(s) in relation to the workpiece part to be lifted. In the direction perpendicular to the gaps, in which a lifting device is joined on the grid of the gaps in the workpiece surface and cannot be positioned in a step-less manner, the workpiece (part) can be shunted in a step-less manner. The result of this is that a step-less positioning of the lifting device relative to the workpiece part is possible despite the grid in the workpiece surface.

It is preferably provided that the profile bodies are formed to be flexurally stiff in their longitudinal extension direction. As a result, larger workpiece support surfaces can also be spanned, and a planar support surface is created. Advantageously, the profile bodies are formed as rectangular tubes or as T-shape or H-shaped profile bodies. In order to ensure a sufficiently flexural stiffness of the profiles, it is preferably provided that the ratio of a length of the profile bodies to a width of the profile bodies is less than 150. The profile bodies thus have a minimum width depending on their length, such that they are not bent too greatly by the frictional forces during the movement of an abutting workpiece. In order to obtain a sufficient flexural stiffness of the profile bodies perpendicular to the workpiece support surface, the ratio of a length to a height of the profile bodies is under 100.

The threshold values stated here can be exceeded if the profile bodies—for example in the middle of the workpiece support surface—are connected to one another by a cross-member. However, such a cross-member reduces the flexibility when positioning the lifting pin, since it causes a dead zone for the effect of the lifting pins.

The profile bodies preferably have an end face side aligned in parallel to the workpiece support surface, on which end face side a brush element is provided. As a result, a workpiece support surface formed by brushes can be created, along which the workpiece to be processed can be moved forwards and backwards in a direction with a low friction for the processing.

Furthermore, it is preferably provided that the brush element comprises several bristle bundles, and at least one row of bristle bundles extending along the outer longitudinal edge of the brush element is laterally outwardly inclined in relation to a vertical alignment. The angle of inclination of these bristle bundles starting from the perpendicular of the workpiece support outwards preferably lies below 45° here, so that workpieces moved across the workpiece support do not hook with the bristle bundles.

As a result of these brush elements on the profile bodies, the gap between them can be reduced, such that a sufficiently sealed workpiece support is formed, and workpieces with any contour can be moved forwards and backwards on the workpiece support, without being caught on the bristles. To do so, preferably no uncovered gap is formed on any point of the workpiece support; in any case a space remaining between two brush elements along the gap should be smaller than 10 mm.

Particularly preferably, the spacing of the centers of the gaps formed between the profile bodies is smaller than 100 mm, in order to ensure a sufficient flexibility for the positioning of a lifting device, which acts on an abutting workpiece part through the gaps.

Another aspect of the invention features a method for loading and unloading a machine described in the preceding paragraphs for the separating processing of plate-shaped workpieces, in which a vertical movement of the loading and unloading device and a horizontal movement of the workpiece support or a support part of the workpiece support takes place between the unloading of a freely separated workpiece part with the aid of at least one lifting device of a loading and unloading module of the loading and unloading module and the loading of the workpiece support with a new workpiece, such that the workpiece support or the workpiece part is arranged above or below the loading and unloading device. As a result of such a method, a multiple use of movement axes and drives is made possible.

Preferably, such a method is implemented on a workpiece support having several profile bodies arranged in parallel to one another, between which profile bodies a gap is formed, in which the at least one loading and unloading module of the loading and unloading device having the lifting device is positioned into an unloading position below the workpiece part abutting on the workpiece support and to be lifted.

If the lifting device of the loading and unloading device has lifting pins, then the lifting pins for lifting a workpiece part can be guided through the gaps formed between the profile bodies in the workpiece support of the machine and can be transferred for abutting on the underside of the workpiece part to be lifted. This enables a flexible and thus quick positioning of the lifting device in the direction in parallel to the profile bodies.

The lifting pins of the lifting device can be guided through the respective gap between two profile bodies, for example, during an extending movement from the lifting device and transferred to the underside of the workpiece part, at least for the support.

When several lifting pins abut or engage on the workpiece part when lifting, a tilt-free lifting can take place. In order to lift out the workpiece part, it can be provided that a holding element is moved from above onto the workpiece part before the lifting of the workpiece part with the lifting pins and this holding element is transferred into a gripping position, and then the lifting movement of the lifting pins is controlled, and the lifting pins are guided for the support on the underside of the workpiece part to be lifted, and then the holding element and the lifting pins are guided together upwards in relation to the workpiece support surface. As a result, a secured lifting takes place. By the lifting pins acting from the underside of the workpiece part, it can be guaranteed that a workpiece part is lifted without catching or tilting in the remaining grid.

Alternatively, it is provided that the lifting movement of the lifting pins is controlled in such a way that the workpiece part is raised in relation to the workpiece support and, then, the holding element is supplied onto the workpiece part from above and engages the workpiece part raised in relation to the remaining grid and transfers, for example, into an unloading station.

The invention and further advantageous embodiments and developments thereof are described and explained in more detail below by means of the examples depicted in the drawings. The features that can be seen in the description and the drawings can be applied, according to the invention, individually or in several different combinations.

DETAILED DESCRIPTION

Figure 1:
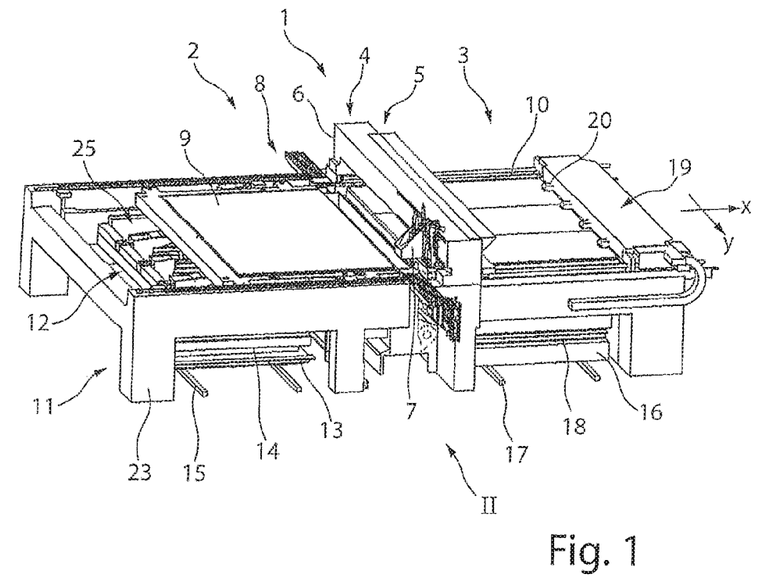
FIG. 1 is a perspective view of a machine for cutting sheets having a two-part workpiece surface.

A machine 1 is depicted in perspective in FIG. 1, which can be formed, for example, as a laser cutting machine. This has a loading region 2 and unloading region 3. A working station 4 is arranged between the loading region 2 and the unloading region 3. The working station 4 comprises a portal-like guiding structure 5 having a portal carrier 6. A processing head, in particular a laser cutting head 7, can be shifted along the portal carrier 6 in a first axis direction (Y-axis direction). Water jet cutting machines, laser welding machines, punching machines or combined punching-laser cutting machines represent further examples for the machine 1 according to FIG. 1.

Below the portal carrier 6 of the machine 1, a workpiece support 8 extends on both sides of the processing station 4. The workpiece support 8 is formed in two parts and comprises a loading-side support portion 9, as well as a further support portion 10, which can be moved relative to the loading-side support part 9 in a second axis direction (X-axis direction). In FIG. 1, the further support part 10 is arranged in the unloading region 3 of the machine 1.

In FIG. 1, the loading-side support portion 9 is supported on a frame-like support structure 11 of the machine 1, which is part of the machine base frame 23. A loader/unloader 12 (shown in FIGS. 2 and 3; covered in FIG. 1) is arranged below the loading-side support portion 9. The loader/unloader 12 is arranged above a workpiece mount, such as a steel sheet pallet 13. Unprocessed plate-shaped workpieces or steel sheets 14 are stacked on the steel sheet pallet 13. Alternatively, workpieces already at least partially processed can also be provided. The steel sheet pallets 13 can be shifted on rails 15 between a position inside and a position outside the frame-like support structure 11.

A remaining grid pallet 16 provided as a product deposit can be shifted in the unloading region 3 of the machine 1 on rails 17 between a position inside the frame-like support structure 11 and a position outside the frame-like support structure 11. The remaining grid pallet 16 bears processing products in the form of remaining grids 18.

Furthermore, FIG. 1 shows a workpiece mover 19, which is motor-driven to shift along the support structure 11 in the X-direction. Clamping claws 20 of the workpiece mover 19 are configured to controllably clamp a steel sheet 14 or a remaining grid 18 on the workpiece mover 19.

Figure 2:
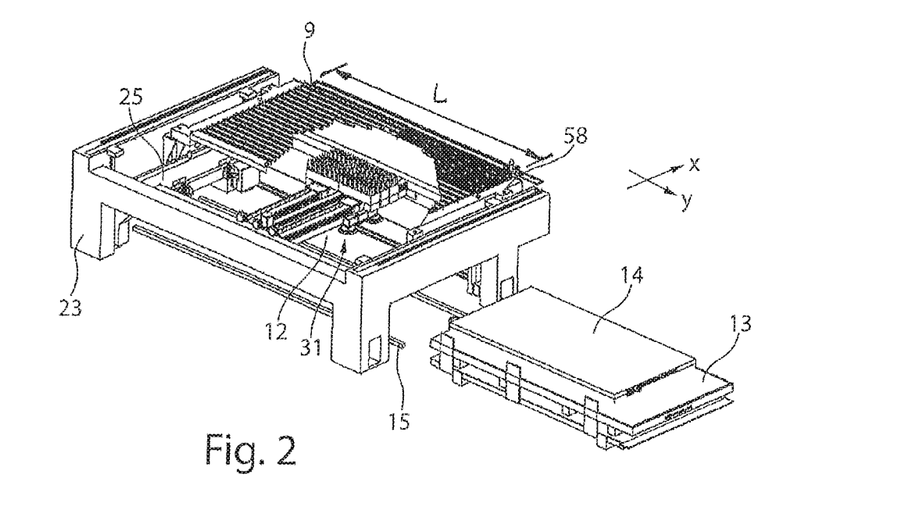
FIG. 2 is a perspective view of a first support part of a workpiece support of the machine according to FIG. 1.

The support portion 9 of the loading region 2 is depicted in perspective in FIG. 2, with the support portion 9 of the workpiece support is partially cut away. The loader/unloader 12 arranged below the workpiece support portion 9 is thus visible. The loader/unloader 12 is motor-driven to controllably move up and down on the machine base frame 23. The loader/unloader 12 comprises a support frame 25 (FIG. 3), which has two support struts 26 and which rests, for example, on a protruding part (not shown) of the machine base frame 23. Preferably, the support frame 25 is formed as a frame sealed all around by the two support struts 26 and two cross-beams 27. Several support beams 29 are received on the support struts 26 and are shiftable in and against the Y-direction between the two cross-beams 27. Two of the three support beams 29 are motor-driven, for example. One or more loader/unloader modules 31 are provided on each motor-driven support beam 29. A non-driven support beam 30, which is shiftably positioned between the two driven support beams 29, holds one or more gripping device 33. For example, three gripping devices 33 are provided on a carriage 34, which can be shifted along the support beam 30. Preferably, the carriage 34 is not powered. The carriage 34 can be returned to a starting position by a pneumatic cylinder (not depicted), if the carriage 34 has been transferred into a position different from the starting position when shifting an unprocessed workpiece 14 into the clamping claws 20 of the workpiece mover 19.

Figure 3:
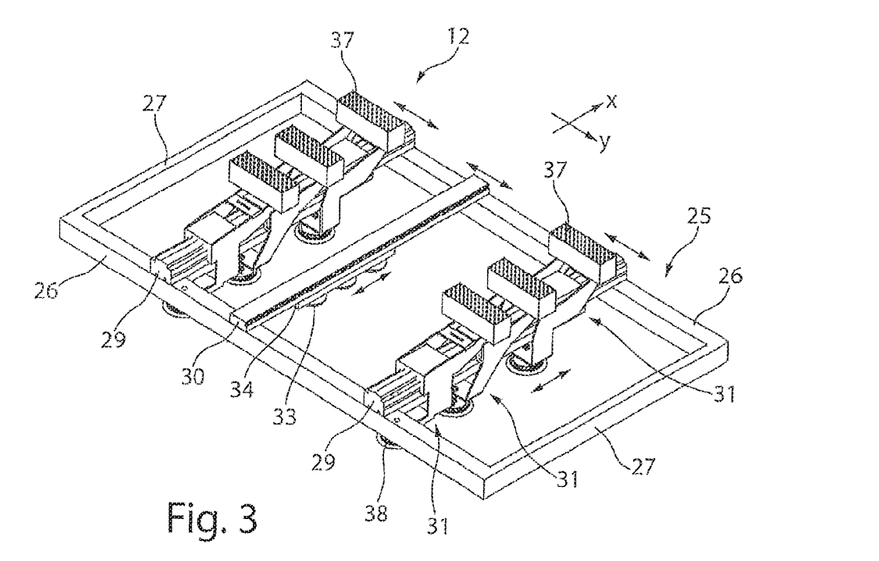
FIG. 3 is a perspective view of a loading and unloading device.

The support beams 29 can be controllably shifted along the support struts 26 by means of a drive not illustrated in more detail. Here, a belt drive can be provided, which engages, for example, on the first and third support beam 29, with a controllable coupling respectively provided between each support beam 29 and the belt drive, in order to individually control the shifting movement of each support beam 29. The central support beam 30 may be forcibly moved by means of one of the outer support beams 29.

Figures 4, 5:
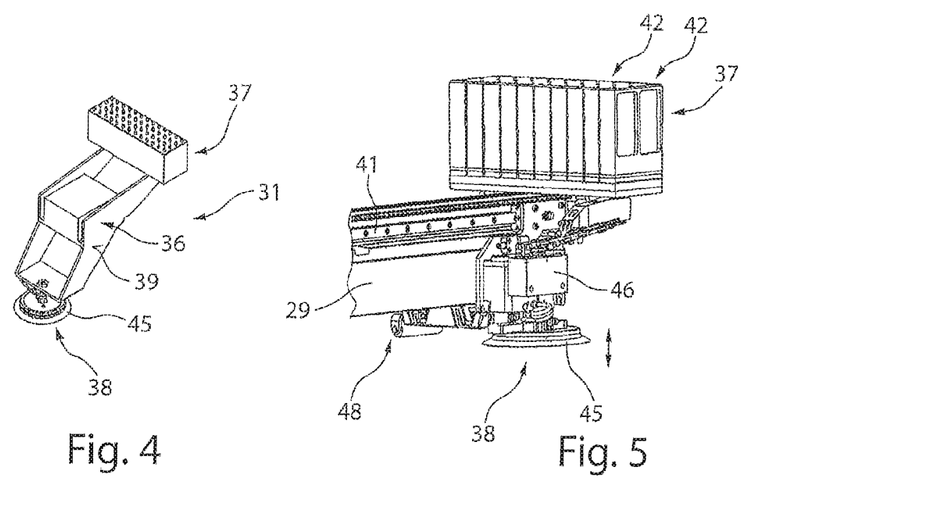
FIG. 4 is a perspective view of a loading and unloading module
FIG. 5 is a perspective view of the loading and unloading module on the support beam.

A loader/unloader module 31 is depicted in perspective and schematically in FIG. 4. This loader/unloader module 31 has a module guide 36, which engages around the support beam at least partially for guiding the loader/unloader module 31. A lifter 37 is arranged above the module guide 36, and a gripper 38 is arranged below the module guide 36. Preferably, the lifter 37 and the gripper 38 are positioned fixedly in relation to each other by side plates 39. The lifter 37 and the gripper 38 are arranged offset in relation to each other when seen in the longitudinal direction of the support beam.

FIG. 5 shows a schematic detailed view of the loader/unloader module on the support beam 29. The loader/unloader module is shiftably guided along the support beam 29 by means of a linear guide 41. The lifter 37 includes several pin modules 42, which are provided arranged in series. Each pin module 42 comprises, for example, three lifting pins 43 (FIG. 7), which are arranged in a common longitudinal axis in the pin module 42. The longitudinal axis of each pin module 42 is aligned in parallel to the longitudinal direction of the support beam 29. The pin modules 42 arranged in series extend in the Y-direction, i.e., in parallel to the shifting direction of the support beam 29 or transversely to the longitudinal axis of the support beam 29 over the width of the support beam 29. In order to extend and retract the pins 43 of the respective pin module 42, these are pneumatically driven. It can also be provided that each individual lifting pin 43 is controlled to be individually extendable in the pin module 42.

A suction element 45 of the gripper 38 is depicted lying opposite the lifter 37 and pointing downwards. This suction element 45 is formed, for example, as a vacuum suction cup. The suction element 45 can be moved vertically up and down by means of a drive 46. Adjacent the gripper 38, advantageously on an opposite side of the support beam 29, a hold-down device 48 is provided, which is provided on the same level as the suction element 45 and has a support roller.

Figure 6:
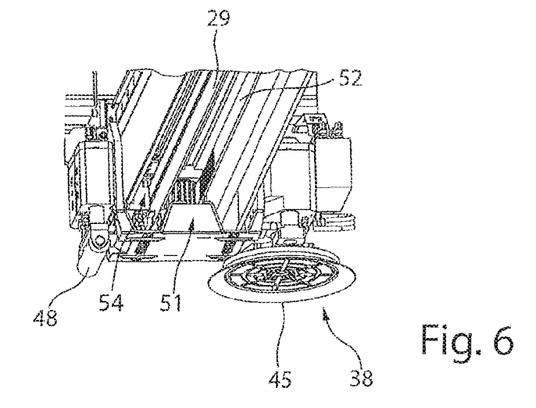
FIG. 6 is a perspective view of a gripping device of the loading and unloading module on the support beam.

From a perspective view from below the support beam 29 according to FIG. 6, a driver 51 is shown, by which the loader/unloader module(s) can be controllably shifted along the support beam 29. Preferably, a belt drive is provided with a drive belt 52, wherein the loader/unloader module 31 can be coupled to the drive belt 52 for a shifting movement.

Figure 7:
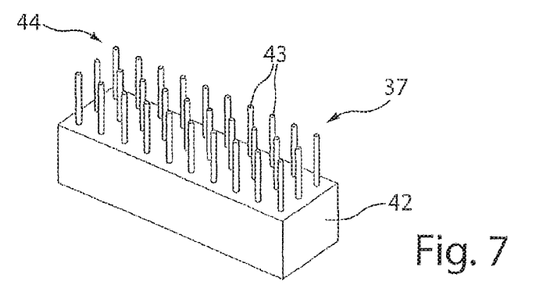
FIG. 7 is a perspective view of the lifting device in a working position.

A view of the lifter 37 having extended lifting pins 43 is depicted in perspective in FIG. 7. All lifting pins 43 of the pin modules 42 are exemplarily depicted in a working position 44, in which the lifting pins 43 are completely extended.

Figure 8:
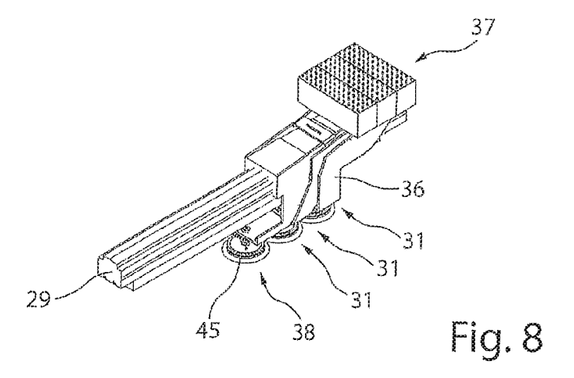
FIG. 8 is a perspective view of an arrangement of several loading and unloading modules on a support beam.

With several loader/unloader modules 31 arranged on the support beam 29, these can be positioned adjacent to one another, as depicted in FIG. 8, or be positioned independent of and separated from one another on the support beam 29, as depicted in FIG. 3. The lifters 37 or the pin modules 42 can be positioned adjacent to one another in order to create a lifting region with a large surface area for larger workpiece parts to be lifted. The module guides 36 are formed in such a way that these can be nested, as shown in FIG. 8.

Figure 9:
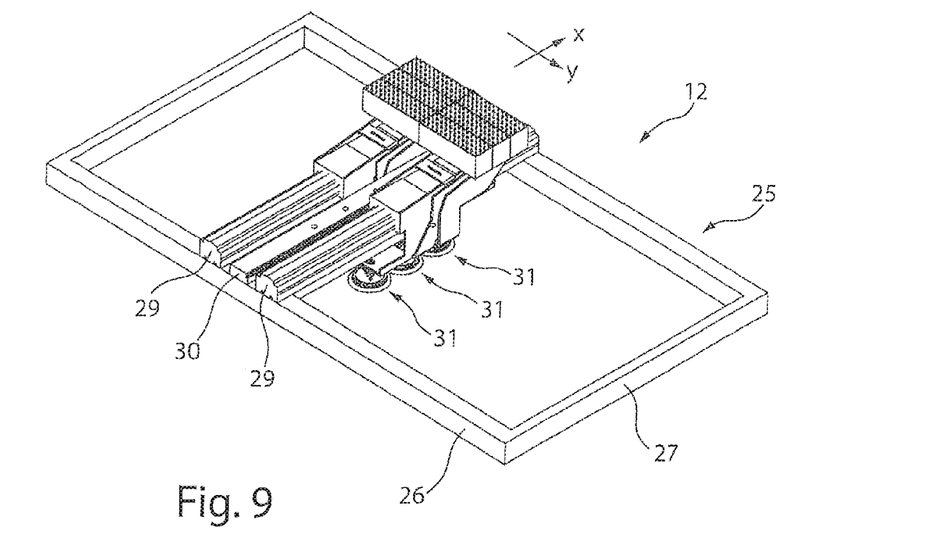
FIG. 9 is a perspective view of several support beams arranged next to one another of the loading and unloading device.

A further arrangement of the loader/unloader modules 31 for forming a larger lifting surface is depicted in FIG. 9. The two outer, motor-driven support beams 29 are moved towards each other. Here, the respective end faces of the lifters 37 of the left and right support beams 29 lie flush with one another, such that the lifters span the non-driven support beam 30. To that end, a number of pin modules 42 are provided on each lifter, covering half the width of the non-driven support beam 30.

Figure 10:
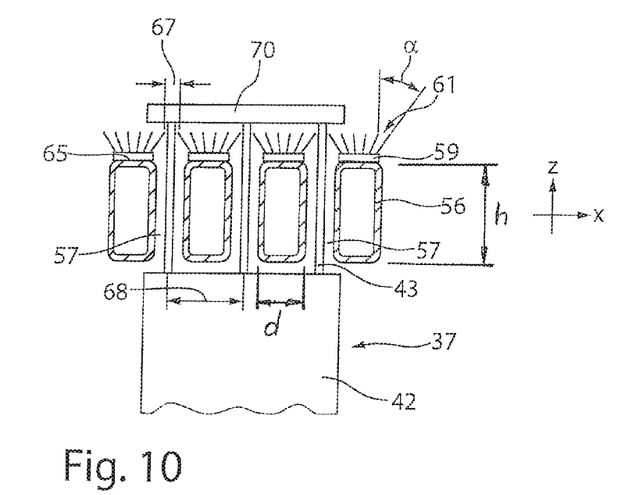
FIG. 10 is a schematic sectional view of a workpiece support of the first and further support part.

A schematic sectional view of the workpiece support 8 from FIG. 2 is depicted in FIG. 10. The workpiece support 8 is formed from a number of profile bodies 56 arranged next to one another, with gaps 57 formed between them. The longitudinal axes of the profile bodies 56 are aligned in the Y-direction. The profile bodies 56 extend with a length L (FIG. 2) to the frame 58 of the workpiece support 9. The profile bodies 56 can be formed, for example, as rectangular tubes having a width d and a height h. The ratio of the length L of the profile bodies 56 to a width d of the profile bodies 56 is preferably formed to be less than 100. In particular, with such ratios, a flexurally stiff profile body 56 is formed, which forms a stiff workpiece support portion 9 in the entirety, in order to resist the forces from movement of an abutting workpiece 14 or a workpiece part 70. These rectangular tubes are arranged on or in a common frame 58 and are aligned in such a way that the longitudinal sides form the gaps 57, and the upper narrow side or end face side 65 of each tube forms a support surface for a brush element 59. The width of gaps 57 is greater than the diameter of the lifting pins 43 of the lifter, preferably the gap width corresponds to 1.5 to 3 times the diameter of the lifting pin 43. The spacing 68 of the gaps 57 in relation to one another, i.e., the spacing of their gap center points, is less than 100 mm.

The brush element 59, which is formed in the form of a brush ledge, has a plurality of bristle bundles 61 extending in the transverse and longitudinal direction, which together form a workpiece support surface of the workpiece support 8. At least one outer row of bristle bundles 61 is inclined laterally at an angle $\alpha$ in relation to the z-direction, along a longitudinal side of the brush element 59. The angle $\alpha$ is less than 45°. This bristle bundle 61 pointing outwards thus reduces the width of the gap 57, such that a space 67 remains, which is below a value of 10 mm, such that a sufficiently sealed workpiece support surface for a workpiece part 70 resting on it is formed. In order to lift the workpiece part 70 in relation to the workpiece support plane or the workpiece support surface, the lifting pins 43 can be guided upwards through the gaps 57 and past the bristle bundles 61, such that raising the workpiece part 70 in relation to the workpiece support 8 is made possible.

A work sequence for loading an unprocessed workpiece or a sheet steel 14 and unloading at least one processed workpiece 70 with the loader/unloader 12 is described in more detail below in FIGS. 11 to 14.

Figure 11:
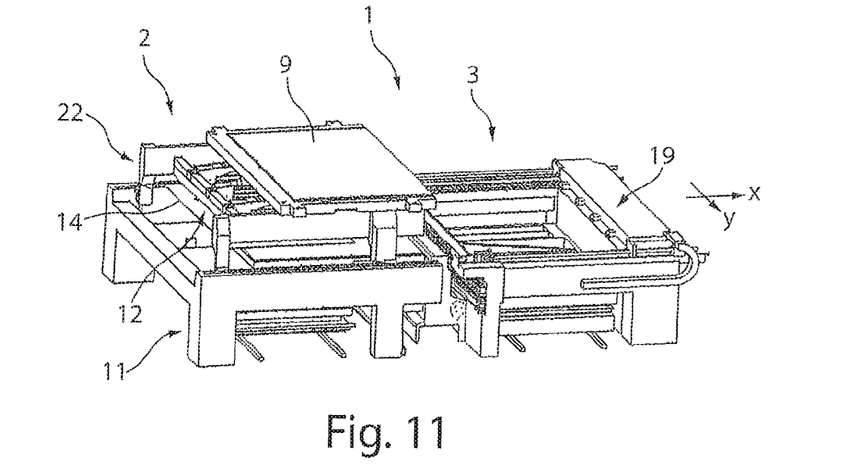
FIGS. 11 to 14 are a sequential perspective view of the machine according to FIG. 1 in various working situations.
Figure 12:
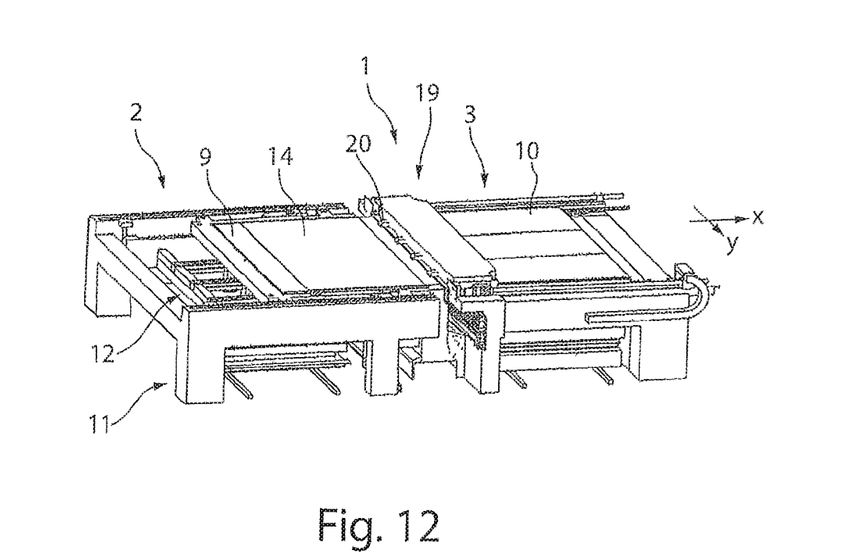
Figure 13:
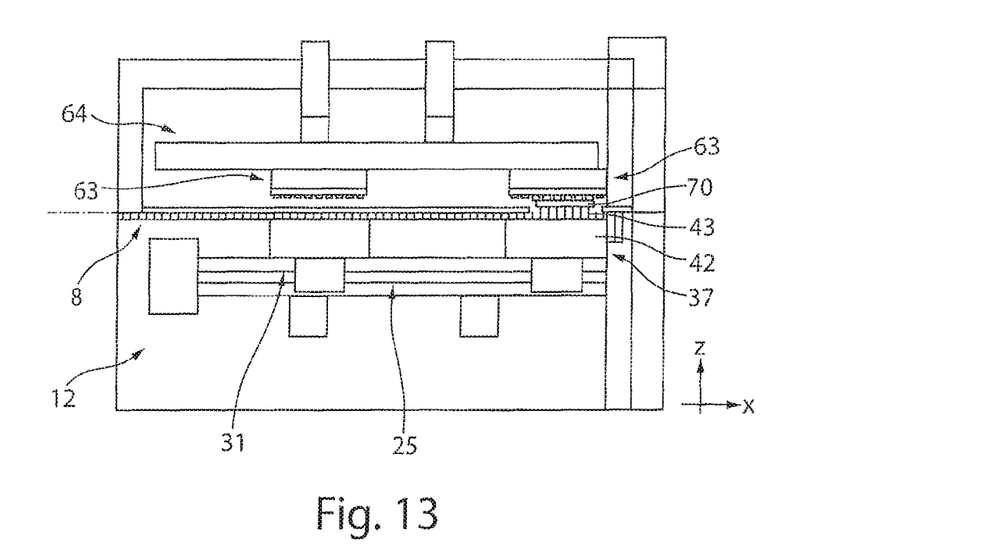
Figure 14:
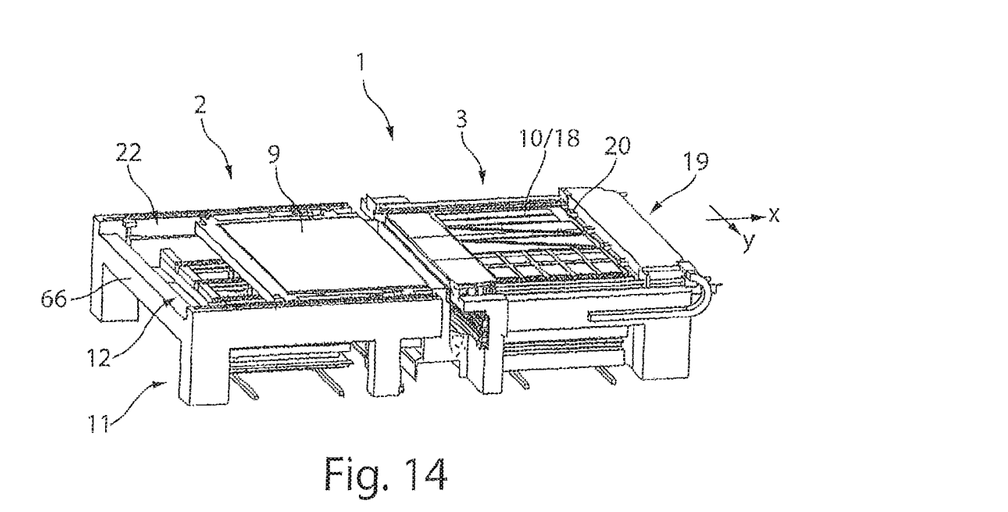

In order to load a workpiece support 8 of a machine 1 with a sheet steel 14, based on an arrangement of the first support portion 9 and the further support portion 10 according to FIG. 1, the loader/unloader 12 is lowered to a lower hoisting level, such that a sheet steel 14 provided on the workpiece stack is grasped by the grippers 38 of the loader/unloader modules 31. Then, the loader/unloader 12 is raised to a loading level, while the first support portion 9 is also simultaneously guided upwards. In addition, the frame 58 of the support portion 9 is raised by the support frame 25 of the loader/unloader 12 from a support surface or from support points on the machine base frame 23 and moved upwards. Subsequently, the further support portion 10 retracts into the loading region 2 and is positioned below the loader/unloader 12 (FIG. 11). Then, the sheet steel 14 is deposited on the further support portion 10 by means of the loader/unloader 12 and pushed into the clamping claws 20 of the workpiece mover 19. After removing the vacuum, the further support portion 10 travels together with the workpiece mover 19 into the unloading region 3. The support portion 9 is lowered to a working level, such that the support portion 9 and the support portion 10 are positioned on the same level, as is depicted in FIG. 12. Then, a processing of the sheet steel 14 (not depicted in more detail) and/or of individual workpiece parts takes place. Smaller workpiece parts can be discharged from the machine via a gap between the first and further surface portions 9, 10. To unload larger workpiece parts 70, the loader/unloader modules 31 of the loader/unloader 12 are positioned on a lifting level, in which the lifter 37 is positioned directly against an underside of the workpiece support 8 (FIG. 13). After that or at the same time, part holders 63 are positioned above the workpiece part 70 to be lifted by means of a holder mover 64. The part holder or holders 63 are lowered onto the workpiece part 70 to be raised and brought into contact. Then, the lifting pins 43 of the pin modules 42 are controlled with respect to the size of the workpiece part 70 to extend, such that those pins are guided through the gaps between the profile bodies of the workpiece support 8 and come into contact with an underside of the workpiece part 70. The part holders 63 are preferably formed as suction gripping cups and grasp the workpiece part 70. Then, the workpiece part 70 is moved vertically upwards with the part holder 63 (Z-direction). Because of the pressure force acting against the lifting pins 43, the lifting movement of the workpiece part 70, where appropriate in relation to the remaining grid 18, is supported. In the event of a tilting or a catching of the workpiece part 70 on the remaining grid 18, a release of the workpiece part 70 can thus be obtained. Then, the part holder 63 is shifted into a region outside support portions 9, 10, and the workpiece part 70 is deposited. For example, a stacking device or receiving device or pallets can be provided on an end face side 66 of the machine base frame 23, which serve for receiving the processed workpiece parts 70.

All cut workpiece parts 70 can be unloaded by this unloading process with the loader/unloader module 31. Also, only those workpiece parts 70 of a size which cannot be guided through a gap between the support portion 9 and the further support portion 10, can be unloaded.

Then, the remaining grid 18 is transferred into the unloading region 3. Starting from the remaining grid 18 arranged in the unloading region 3 (FIG. 14), the first support portion 9 is raised to a loading level. The further support portion 10 is shifted into a loading position, as is depicted in FIG. 11. Then, the remaining grid 18 can be supplied downwards and deposited on the remaining grid pallet 16. A further loading cycle can begin.

Figure 15:
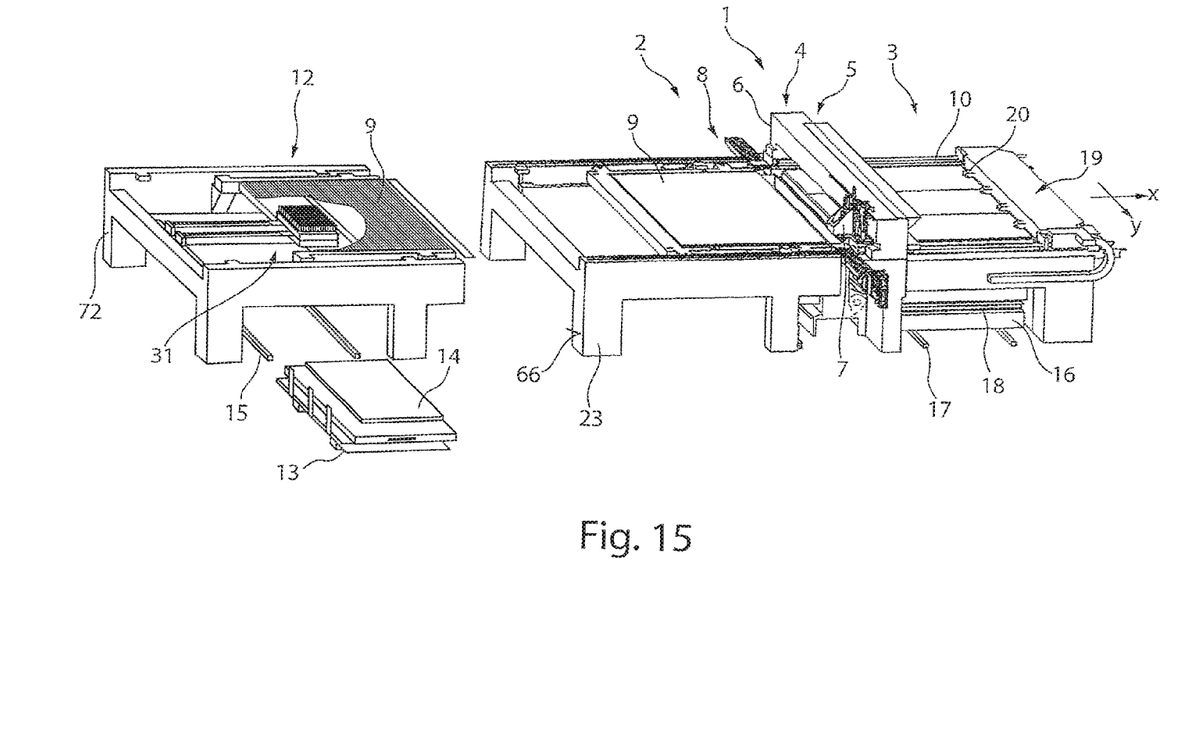
FIG. 15 is a perspective view of the machine according to FIG. 1 having an alternative arrangement of the loading and unloading device.

A further alternative embodiment of the machine 1 having a loader/unloader 12 positioned in relation to the machine base frame 23 is depicted in FIG. 15. This loader/unloader 12 has an individual frame 72 and is allocated to an end face side 66 of the machine base frame 23, for example. The loading and unloading process of an unprocessed workpiece or sheet steel 14 and cut workpiece parts 70 takes place in analogy to the procedure described above according to FIGS. 11 to 14, wherein, in this example, only the first support portion 9 has to be horizontally shiftable in the X-direction, in order to be retracted and extended into the loader/unloader 12 or arranged above or below the support frame 25, as described in the loading region 2 of the machine 1 in relation to FIGS. 11 to 14. In a further alternative machine 1, the workpiece support 8 is formed continuously and can be shifted horizontally as a whole.

The separate allocation of the loader/unloader 12 in relation to the machine 1 has the advantage that the process time can be retrospectively increased because of an automatic loading and unloading.

What is claimed is:

1. A loader/unloader for a plate-shape workpiece processing machine, the loader/unloader comprising:
    two support struts configured to be moved vertically with respect to a base frame of the machine;
    a support beam mounted on the support struts and shiftable horizontally on the support struts; and
    a loader/unloader module shiftably received on the support beam and operable to lift a freely separated workpiece part and to grip an unprocessed plate-shaped workpiece, the loader/unloader module comprising:
        a lifter controllably operable to raise the freely separated workpiece part disposed above the module, and
        a gripper directed downwards and operable to retain the unprocessed, plate-shaped workpiece disposed below the module.

2. The loader/unloader of claim 1, wherein the lifter is positioned above the support beam, and the gripper is positioned below the support beam.

3. The loader/unloader of claim 1, wherein the lifter and the gripper are connected to each other and to a common guide, the lifter and the gripper are shiftably mounted on the support beam by the common guide.

4. The loader/unloader of claim 1, wherein the lifter is offset with respect to the gripper along the support beam, such that in an end position the lifter extends over one of the support struts.

5. The loader/unloader of claim 1, the loader/unloader module is one of multiple loader/unloader modules movable with respect to one another into a configuration in which the lifters of the multiple modules are disposed adjacent to each other to form a combined lifting surface.

6. The loader/unloader of claim 1, wherein the support beam comprises a motor-driven support beam shiftable along the support strut, the loader/unloader further comprising at least one shiftable and non-driven support beam arranged on the support strut.

7. The loader/unloader of claim 6, wherein the at least one shiftable and non-driven support beam has one or more gripping devices.

8. The loader/unloader of claim 7, wherein several gripping devices of the at least one shiftable and non-driven support beam are arranged on a carriage guided on the at least one shiftable and non-driven support beam.

9. The loader/unloader of claim 1, wherein the support beam comprises one of two motor-driven support beams each carrying a loader/unloader module with a lifter extending transversely a sufficient distance from the support beam, wherein each of the two motor-driven support beams are positionable with end faces of the lifters abutting one another over a non-driven support beam therebetween.

10. The loader/unloader of claim 1, wherein the lifter comprises several individually controllable pin modules, each pin module comprising one or more lifting pins operable to retract and extend.

11. The loader/unloader of claim 1, wherein the gripper has at least one suction element moveable up and down with respect to the support beam.

12. The loader/unloader of claim 1, wherein the lifter and the gripper are pneumatically operable by a common compressed air supply.

13. The loader/unloader of claim 1, wherein the loader/unloader module further comprises a hold-down device disposed adjacent the gripper and directed vertically downwards.

14. A workpiece processing machine configured to process plate-shaped workpieces into multiple separate parts, the machine comprising:
    a workpiece support configured to support both a workpiece to be processed during a processing of the workpiece, and a processed workpiece part, and
    the loader/unloader of claim 1 selectively positioned vertically below or laterally adjacent the workpiece support, wherein at least a part of the workpiece support is shiftable horizontally above and below the loader/unloader.

15. The machine of claim 14, wherein a support surface of the workpiece support is formed by several parallel profile bodies spaced apart to define gaps therebetween and arranged to support a workpiece.

16. The machine of claim 15, wherein the lifter comprises several lifting pins defining a spacing relative to one another in a direction perpendicular to the profile bodies and that corresponds to a spacing of the gaps.

17. The machine of claim 14, wherein the loader/unloader is disposed under a portion of the workpiece support, and wherein the support part of the workpiece support is moveable in a vertical direction by means of the loader/unloader.

18. A method of loading and unloading workpieces and processed workpiece parts on a workpiece support of a machine according to claim 14, wherein a vertical movement of the loader/unloader and a horizontal movement of at least a portion of the workpiece support over or under the loader/unloader takes place between unloading of a freely separated workpiece part by means of the lifter of the loader/unloader module and loading of the workpiece support with a new workpiece.

* * * * *